United States Patent [19]
Allard et al.

[11] Patent Number: 5,215,180
[45] Date of Patent: Jun. 1, 1993

[54] CAN ORIENTATION APPARATUS

[75] Inventors: Stephen J. Allard; Philip Manning, both of Worcester, Great Britain

[73] Assignee: CarnaudMetalbox plc, Worcester, England

[21] Appl. No.: 711,019

[22] Filed: Jun. 6, 1991

[51] Int. Cl.$^5$ ............................................ B65G 47/244
[52] U.S. Cl. ..................................... 198/395; 198/379
[58] Field of Search ........................ 198/379, 394, 395

[56] References Cited

U.S. PATENT DOCUMENTS

| | | | |
|---|---|---|---|
| 2,293,553 | 8/1942 | Magnusson | 198/394 |
| 2,734,619 | 2/1956 | Labombarde | 198/379 |
| 3,336,723 | 8/1967 | Shazor, Jr. | 198/379 X |
| 3,415,350 | 12/1968 | Murphy | 198/395 X |
| 3,527,334 | 9/1970 | Wideman | 198/379 |
| 3,541,751 | 11/1970 | Quebe et al. | 198/395 X |
| 3,580,380 | 5/1971 | Phillips | 198/376 |
| 4,074,130 | 2/1978 | Messman et al. | 250/223 R |
| 4,143,754 | 3/1979 | Eldred | 198/394 X |
| 4,561,534 | 12/1985 | Nalbach | 198/395 X |
| 4,957,197 | 9/1990 | Delapierre | 198/379 X |
| 5,074,399 | 12/1991 | Kettle et al. | 198/395 |

Primary Examiner—Robert P. Olszewski
Assistant Examiner—James R. Ridwell
Attorney, Agent, or Firm—Watson, Cole, Grindle & Watson

[57] ABSTRACT

A machine for rotationally orientating containers grouped in a multipack comprises endless chains with dogs for feeding the multipacks into the orientation station at which pneumatic cylinders are provided for raising lifters which lift the respective containers into engagement with respective chucks. The chucks are accommodated in pockets formed in a chuck housing and defining tapered surfaces to guide the containers onto the chucks. A stripper bar is provided to disengage the containers from the chucks after orientation is complete.

16 Claims, 13 Drawing Sheets

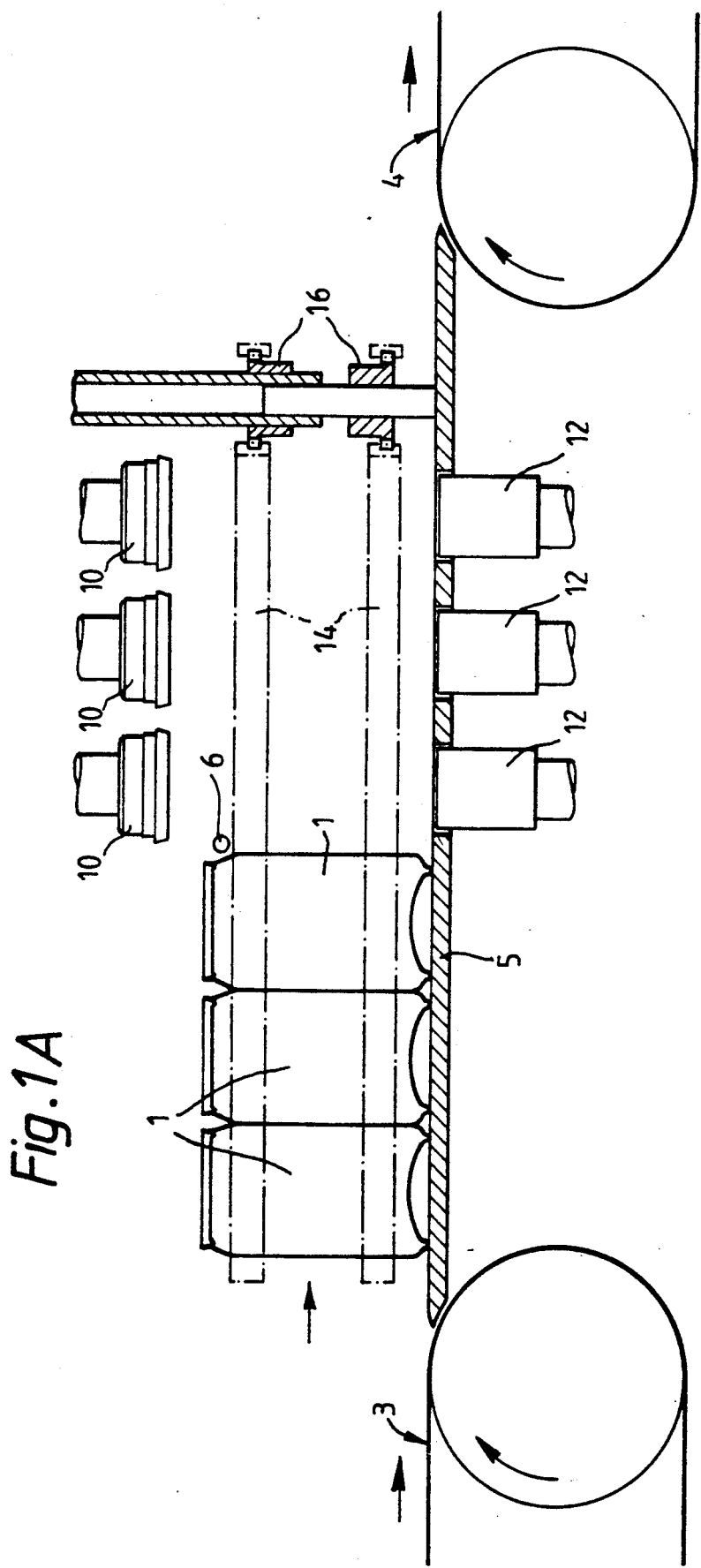

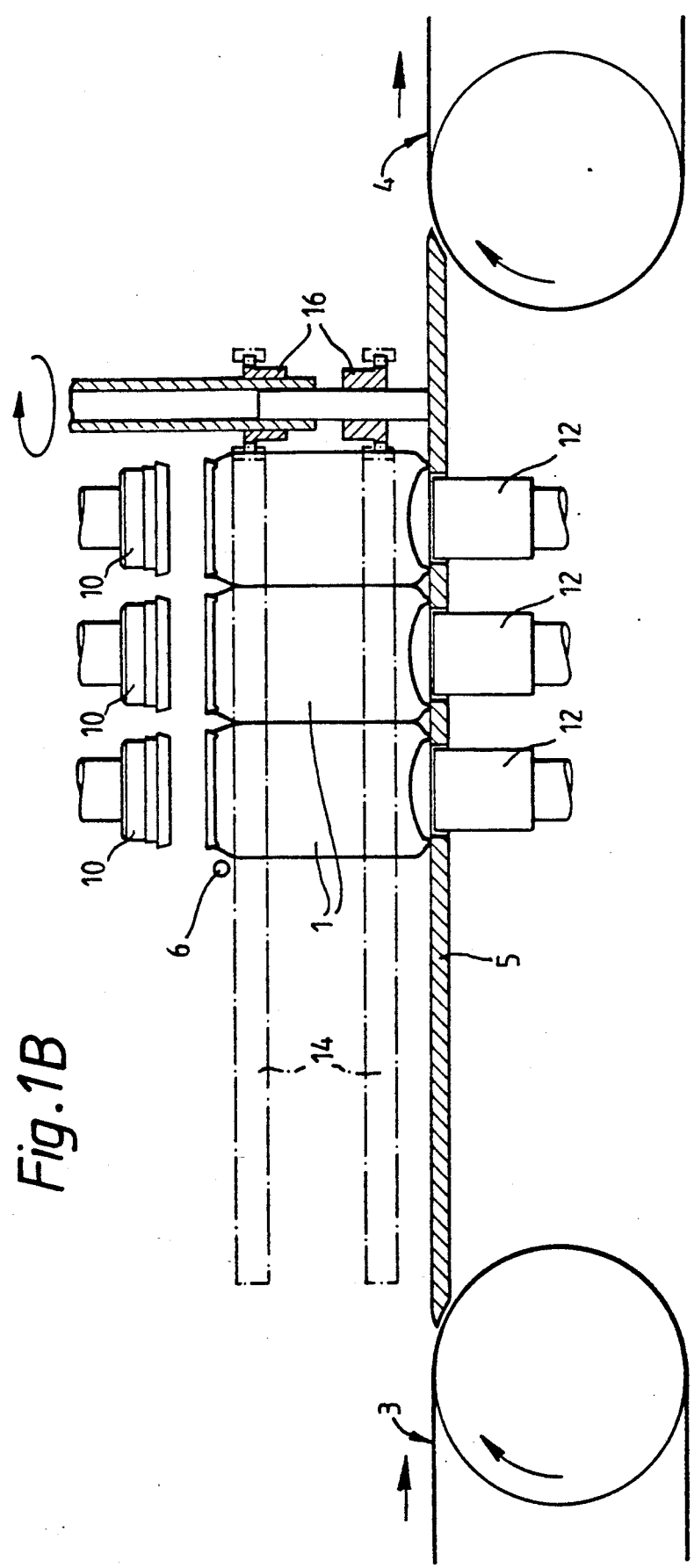

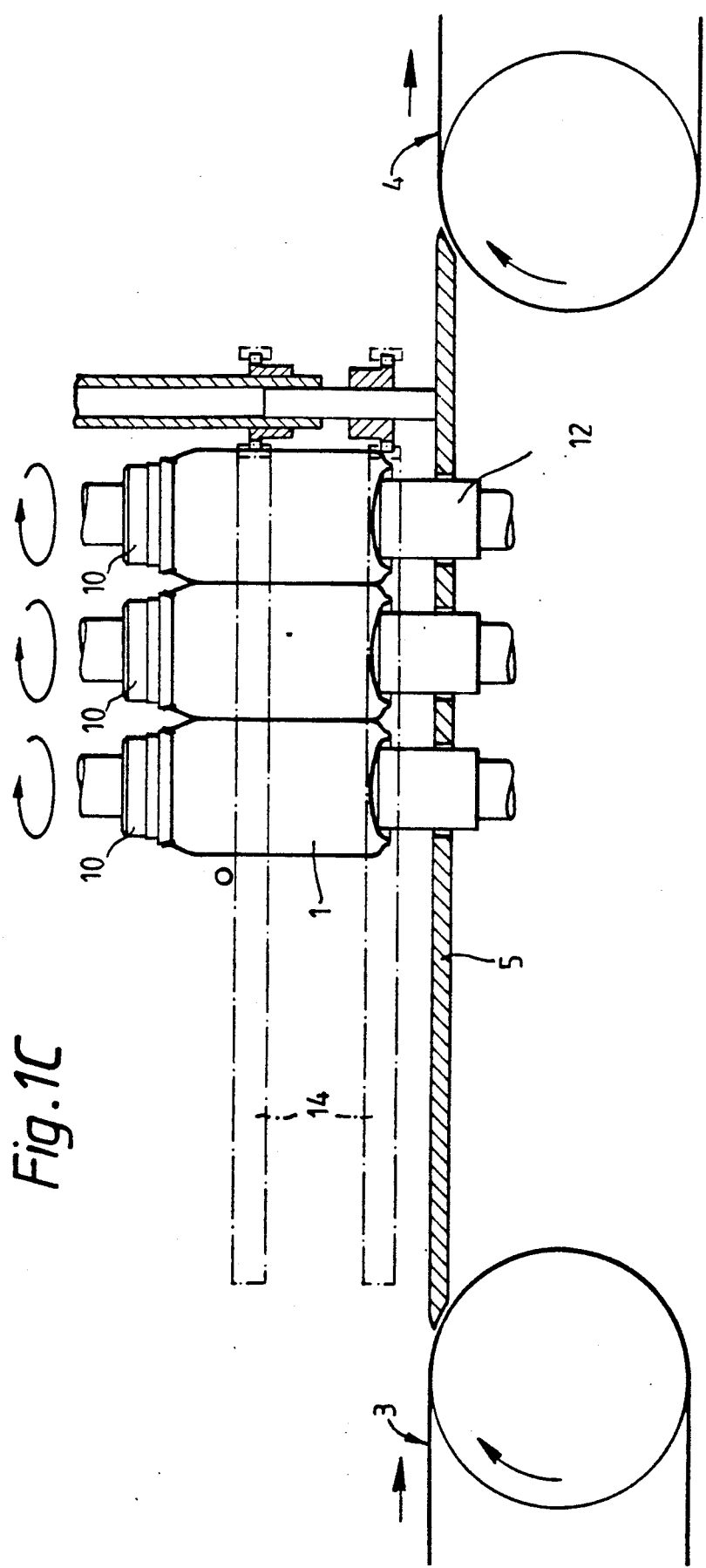

CAN ORIENTATION APPARATUS

FIELD OF THE INVENTION

This invention relates to apparatus for the orientation of containers, especially cans, which are grouped together and held in a predetermined array by a coupler by means of which the containers are secured releasably together. Such container multipacks most commonly have a 2×2, 2×3, 2×4 or 2×6 array of containers, although other arrays, e.g. 4×3 are also known.

A well known form of coupler used for multipacks of beverage cans is a sheet plastics coupler as currently marketed in GB under the trade name Hi-Cone.

It is often desirable for the containers of a multipack to be rotationally or angularly orientated, so that the containers present their labels in a uniform and attractive manner during display to customers at the point of sale.

BACKGROUND

In UK patent application No. 2213121 there is proposed an apparatus for orientating containers connected together by a plastic coupler which is relied upon to prevent inadvertent rotation of the individual containers from their desired orientated positions, but the speed of operation of the apparatus in terms of the numbers of packs which can be handled in a given time is limited by the strength of the coupler and due to the machine construction.

In the machine of UK patent specification 2213121, a container multipack is advanced to an orientation station by helical scrolls which have their axes parallel and extending in the feed direction. When the scrolls are rotated they first engage the leading containers of the multipack and then, as the multipack moves forwardly, the scrolls engage in turn the successive ranks of containers in the multipack. It has been found that if the scrolls are rotated at high speed to produce rapid advancement of the multipack, the coupler can be stretched and deformed, because the scrolls initially engage only the cans in the first rank, with the result that the machine malfunctions. In order to be acceptable for incorporation in modern beverage can packaging lines, which typically have operating speeds of 3000 cans per minute, or even higher, it is desirable that a can orientation machine should be capable of handling at least 100 multipacks per minute, depending upon the number of containers included within the multipacks. None of the can orientation machines previously proposed are capable of operating satisfactorily at such speeds, which is one reason why they have not gained commercial acceptance.

In UK Patent No. 1247450 there is disclosed an apparatus for orientating containers grouped in a multipack wherein clamps are provided for transferring the multipacks to the orientation station. The clamps are controlled by cams so that they are pivoted inwardly and outwardly for engaging and releasing the containers in a multipack and are reciprocated backwards and forwards for advancing successive multipacks. The maximum speed which can be achieved by means of such a transfer mechanism is also severely restricted.

In the prior art apparatus of both GB-A-2213121 and GB 1247450, upon arrival of a multipack at the orientation station the containers are raised by respective lifting members to engage the upper ends of the containers with respective chucks which are driven to rotate the containers during the orientation process, the lifting members being freely rotatable about their respective axes. The lifting members are mounted on a common carrier which is itself raised and lowered by a cam arrangement. A cam actuated lifting assembly has been found unacceptable for high speed operation because it causes container bounce and hence a level of vibration which can not be tolerated. With the lifters supported by a common carrier, the mass raised and lowered each time is substantial, which adds to the vibration problem.

In order to achieve accurate orientation of the containers it is necessary that they should engage precisely the chucks by means of which the containers are rotated. If the containers are subjected to very rapid lifting by means of lifting members which are engaged with the container bottoms, the containers are liable to tilt so that they do not engage correctly the chucks. Furthermore, when the lifting members are lowered the cans must disengage themselves from the chucks. If the containers do not have a good fit with the chucks there is a chance that they will not be reliably rotated due to slipping between the containers and chucks, but if there is a close fit the containers may fail to disengage from the chucks so that operation of the can orientation machine, and possibly the entire container packaging line, must be interrupted. These problems are not addressed by the aforementioned British patent specifications and the apparatuses disclosed therein do not offer any solution to them.

It is a primary object of the present invention to provide a container orientation apparatus which can operate reliably at high speed to enable the apparatus to be incorporated in a container filling and packing line.

Another object of the invention is to provide a container orientation apparatus having a feed system capable of delivering successive multipacks to an orientation station at a high feed rate without risk of damage to the coupler holding together the containers of the multipack or to the containers.

A further object of the invention is to provide a container orientation apparatus having independent lifting members for raising the respective containers of a multipack at an orientation station.

A still further object of the invention is to provide a container orientation apparatus having means to guide the containers into engagement with the chucks, and having means to ensure disengagement of the containers from the chucks.

It is also an object of the invention to provide a container orientation apparatus which is easily adjustable to suit containers of different heights.

SUMMARY OF THE INVENTION

Disclosed in the present specification is a container orientation apparatus for rotationally orientating containers of multipacks in which the containers are held grouped together in a predetermined array by a packaging coupler, the apparatus generally comprising feeding means for feeding multipacks along a linear path from a reception station to an orientation station, a plurality of chuck means arranged at the orientation station for engagement by respective containers, a plurality of lifting members arranged at the orientation station in vertical alignment with respective chuck means, raising means actuable to raise the lifting members to lift the containers into engagement with the respective chuck means, a respective drive means coupled to each chuck means for rotating the chuck means and a container engaged therewith, sensor means for scanning the rotating containers and detecting a predetermined feature on each container, and control means coupled to the sensor means and the chuck drive means for rotation of the containers to be ceased with each of the containers having a desired rotational position, operation of the feeding means to feed a following multipack to the orientation station causing a multipack of orientated containers at the orientation station to be delivered away from the orientation station.

In accordance with an important feature of the present invention the multipack feeding means comprises a pair of endless chains located on opposite sides of the feed path and carrying abutment elements or dogs spaced apart at certain intervals around the chains. The chains are each guided for movement around a closed path including a linear section parallel to the feed path, and the chains are coupled to a common feed motor so as to be driven synchronously and at equal speeds. When a multipack is ready to be fed to the orientation station the motor is energised to drive the endless chains through a partial circuit of their closed paths, thereby bringing dogs on the chains into abutment with the rearmost containers of the multipack and causing the multipack to be pushed forwards by the dogs. The dogs have rearwardly inclined abutment surfaces and the chains are guided so that the dogs move along curved arcs into gradual abutment with the containers so that impact forces are reduced and the containers will not suffer damage. Because the containers are pushed from behind, there are no forces acting to stretch the coupler and there is no risk of it being distorted. High speed operation is made possible because the chains can be directly driven by the motor, i.e. without intervening cam mechanisms or the like to produce reverse or reciprocal movements, and the low inertia of the chains and dogs to permit rapid acceleration and deceleration.

In accordance with an advantageous feature of the invention the means for raising the lifting members comprise separate double acting pneumatic cylinders. Although the cylinders are actuated at the same time, because they are independent of each other it is ensured that each container is pressed against its associated chuck with the appropriate force and vibration is kept to an acceptable level, even with the lifting members being raised and lowered at high speed.

According to another advantageous feature the chucks are disposed within respective cavities in a chuck housing, and the cavities have upwardly tapered guide surfaces extending around the chucks for guiding the containers into correct engagement with the chucks if they do not approach the chucks in correct alignment. The chucks are shaped to make a good fit with the tops of the containers and are preferably tapered themselves to further ensure accurate engagement of the containers. For disengaging the containers from the chucks if they should not immediately fall away from the chucks when the lifting members are lowered, a stripper bar is provided. The stripper bar is mounted on pneumatic cylinders which are actuable to lower the bar to strike against the container rims and thereby release them from the chucks.

A container orientation apparatus embodying the foregoing features is capable of reliable high speed operation making it possible to orientate the containers of multipacks at a rate of 100 to 200 packs per minute and even higher.

Further objects, features and advantages of the invention will become apparent from the following detailed description of some embodiments, given by way of non-limiting example and with reference to the accompanying drawings.

DESCRIPTION OF THE DRAWINGS

FIGS. 1A, 1B, 1C and 1D are schematic partial cross sectional views illustrating successive stages during operation of a container orientation machine in accordance with the invention;

DESCRIPTION OF THE PREFERRED EMBODIMENTS

Figure 1D:
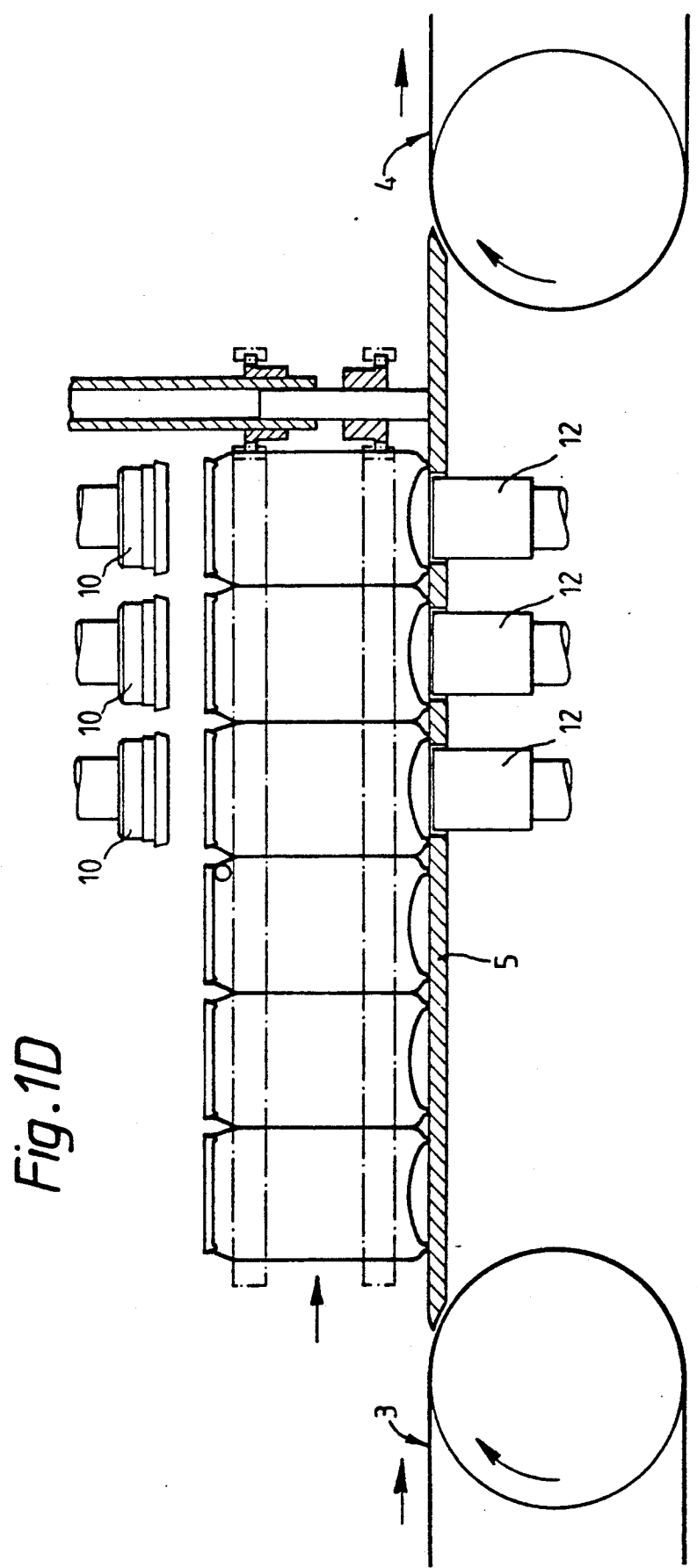
Figure 2:
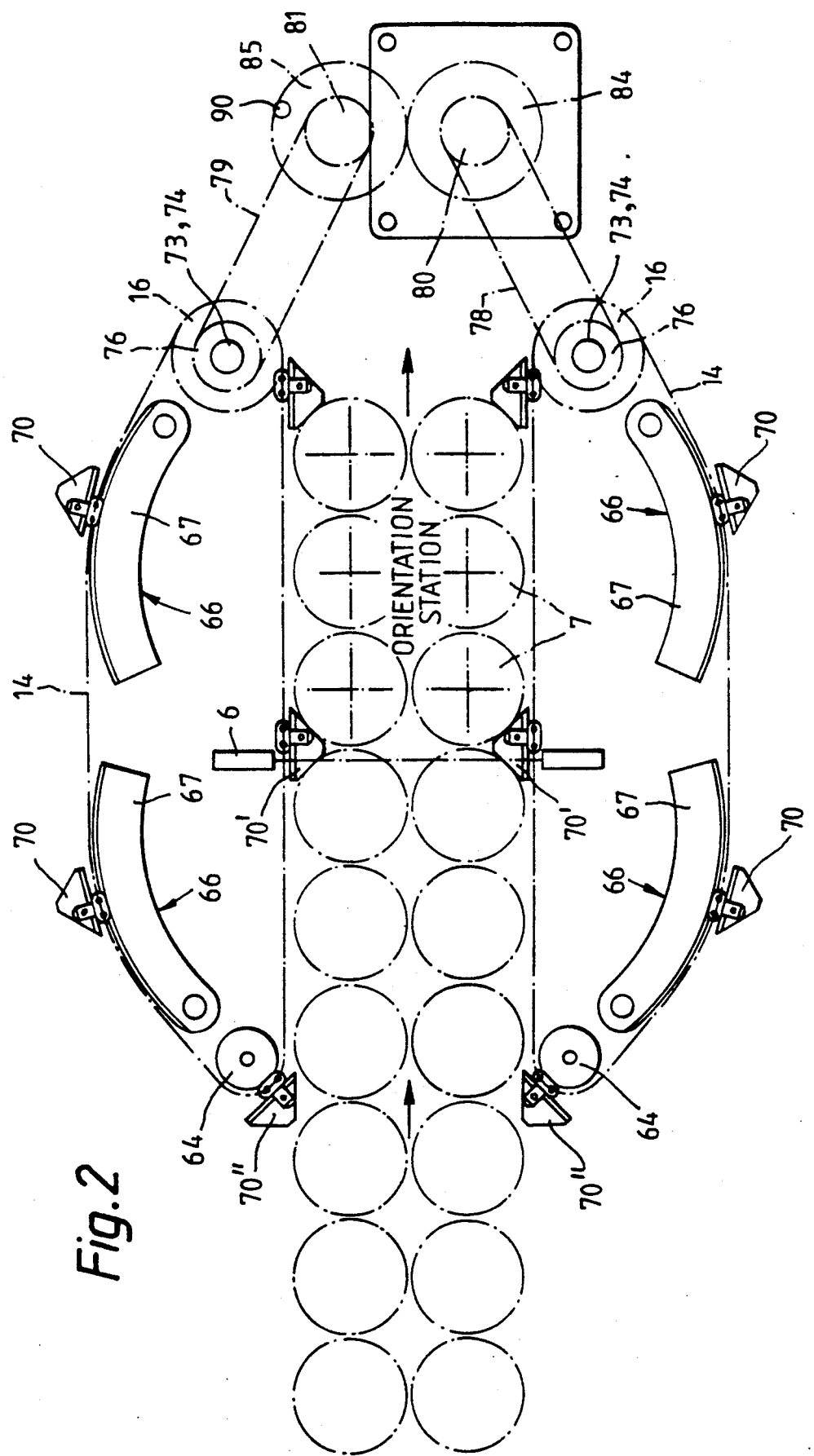
FIG. 2 is a schematic plan of the multipack feed mechanism of the container orientation machine.

In FIGS. 1A–1D there are illustrated the basic steps involved in rotationally orientating a group of six containers, in particular beverage cans 1, held together in a 2×3 array by a sheet plastics coupler, the orientation being performed by a can orientation machine in accordance with the invention and described in more detail herein below. For ease of illustration the coupler has not been shown in the drawings, but such couplers are very well known in the art and it will be readily understood that the coupler surrounds and grips each of the cans individually at the neck defined between the top rim of the can and the body of the can. Conveyors 3, 4 which do not form part of the orientation machine are shown for conveying the multipacks to and from the machine respectively.

The can orientation machine includes a skid plate 5 for receiving the multipack from the conveyor 3, and a sensor 6 for detecting when the multipack has arrived at the reception station of the machine and is ready to be fed to an orientation station located forwardly, along a linear feed path, in front of the reception station. At the orientation station there are six rotary chucks 10 arranged in a group corresponding to the array of cans in the multipack, and coupled to be driven by respective servomotors (not shown in FIG. 1). Mounted below the skid plate 5 at the orientation station and protruding through holes therein are six freely rotatable lifters 12 vertically aligned with the chucks 10, the lifters being carried on respective double acting pneumatic cylinders (not shown in FIG. 1). The feed mechanism for feeding a multipack from the reception station to the orientation station comprises endless chains 14 equipped with dogs (not shown in FIG. 1) and trained around driving gears 16 which are coupled to a feed drive motor. Upon a multipack arriving at the reception station and being detected by the sensor 6, the feed drive motor is energised to rotate the gears 16 through a certain number of revolutions so that dogs carried on the chains 14 are brought into abutment with the trailing cans of the multipack and push the multipack forwards to the orientation position, as depicted in FIG. 1B, where the multipack stops with its containers 7 aligned with the chucks 10 and associated lifters 12. The pneumatic cylinders are then actuated to raise the lifters 12 and lift the cans into engagement with the chucks 10, following which the chucks are set in rotation to rotate the cans about their axes, as shown in FIG. 1C. The chucks are shaped to fit inside the rims at the tops of the cans and have tapered surfaces for cooperating with the inside surfaces of the rims to ensure good frictional contact between the chucks and the cans. Fibre optic sensors (not shown in FIG. 1) scan the respective containers as they are rotated for detecting known features on the can surfaces which provide an accurate indication of the rotational position of the containers. The features relied upon may be part of the decoration applied to the cans, a bar code feature, or a special mark applied to the cans for orientation purposes. Having identified the feature in question, the chucks 10 are controlled so that the rotation of the respective containers finally ceases with each container in its desired rotational position. When orientation of all the containers in the multipack has been completed, the pneumatic cylinders are actuated to lower the lifters 12 and hence lower the cans 1 onto the skid plate 5, as shown in FIG. 1D. The multipack of orientated containers is then ready to be delivered out of the machine onto the conveyor 4, which occurs when a following multipack arriving at the reception station is detected by the sensor 6 and the feed mechanism is activated once more.

Figure 3:
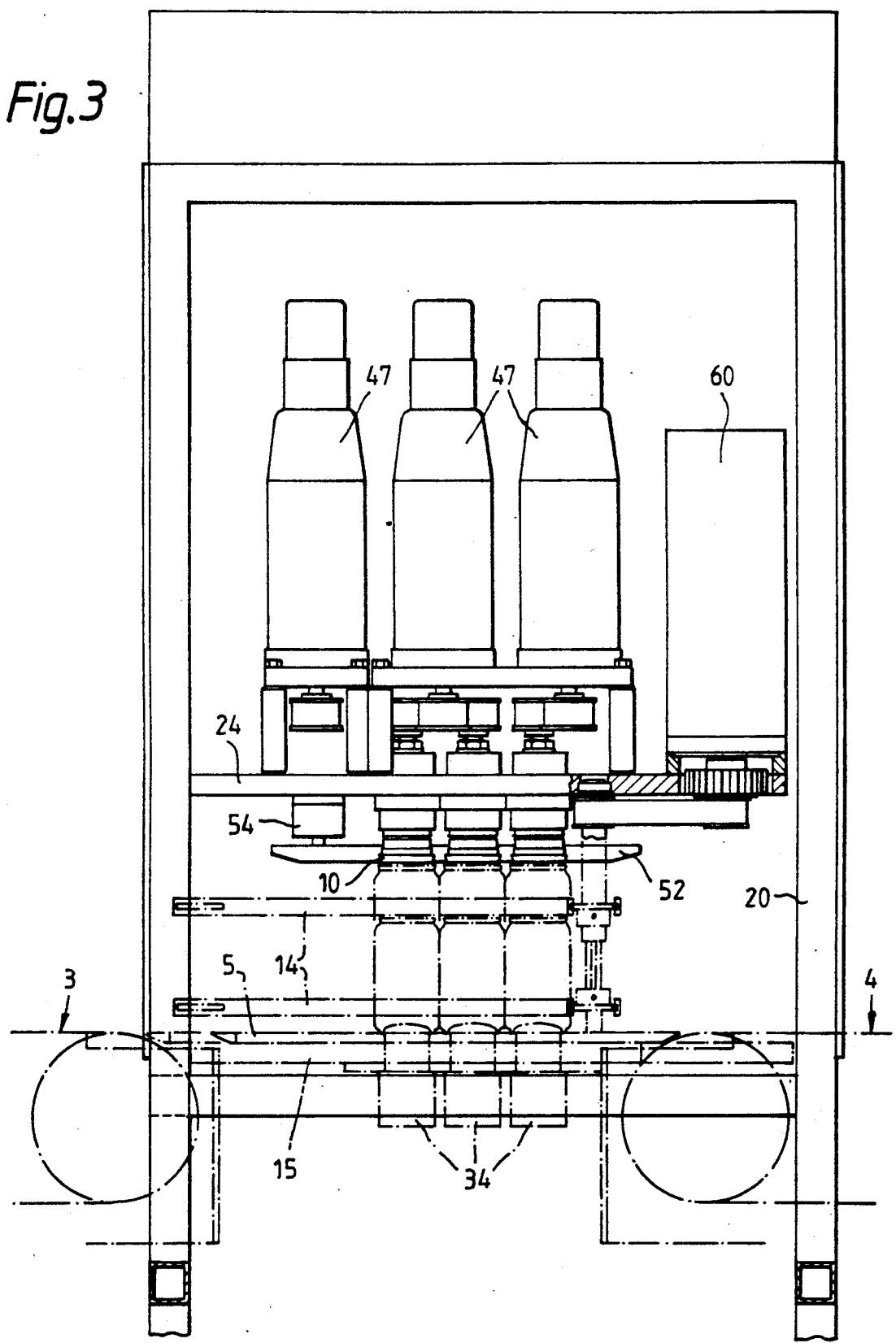
FIG. 3 is a side view of a container orientation machine according to the invention and arranged for orientating containers grouped in a 2×3 array.
Figure 4:
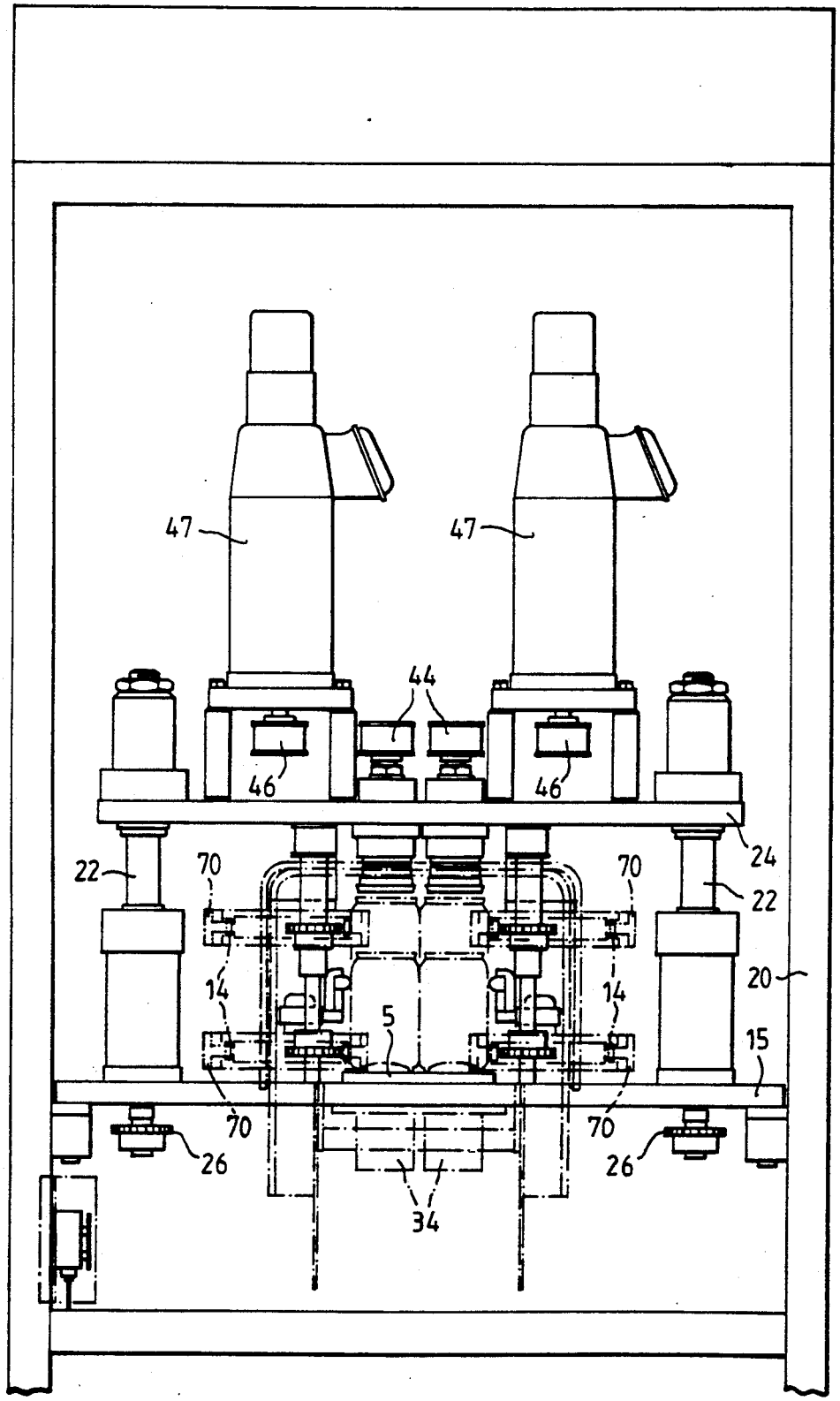
FIG. 4 is a front end view of the machine shown in FIG. 3.
Figure 5:
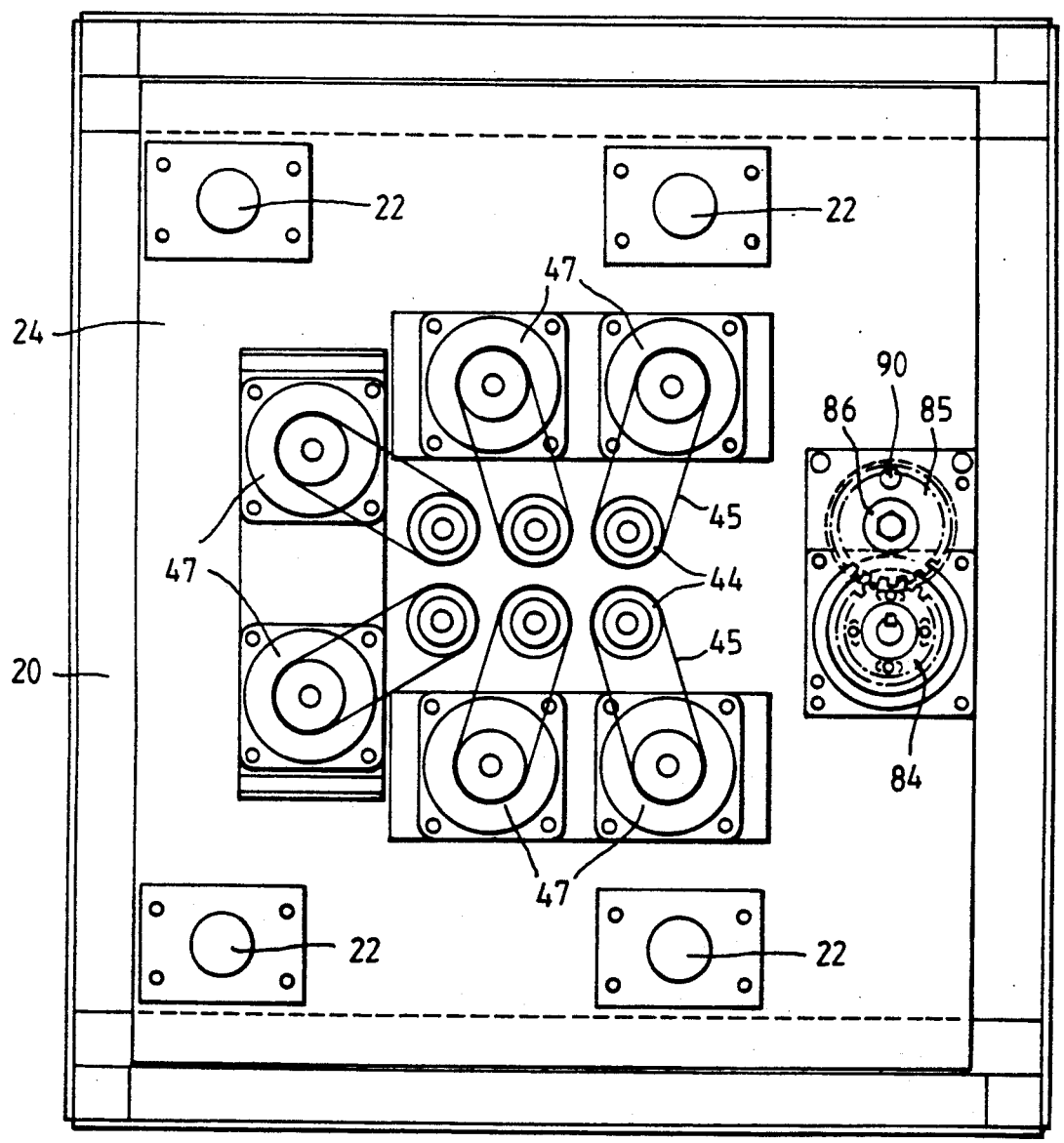
FIG. 5 is a plan view, shown on a larger scale, of the machine illustrated in FIGS. 4 and 5.

The machine of the invention is illustrated in more detail in FIGS. 3 to 5. It has a frame 20 on which a table 15 is fixedly mounted. Supported above the table 15 by four columns 22 is a support platform 24. The length of the columns between the table 15 and platform 24 is adjustable to vary the height of the platform above the table to allow the machine to be adjusted for orientating containers of different heights. The columns have spindles projecting downwardly through the table and carrying sprockets 26 around which a chain (not shown) is trained for adjusting the columns in unison so that the platform 24 always remains horizontal. As depicted in FIGS. 3-5, the platform is adjusted for orientating tall cans.

Figure 6:
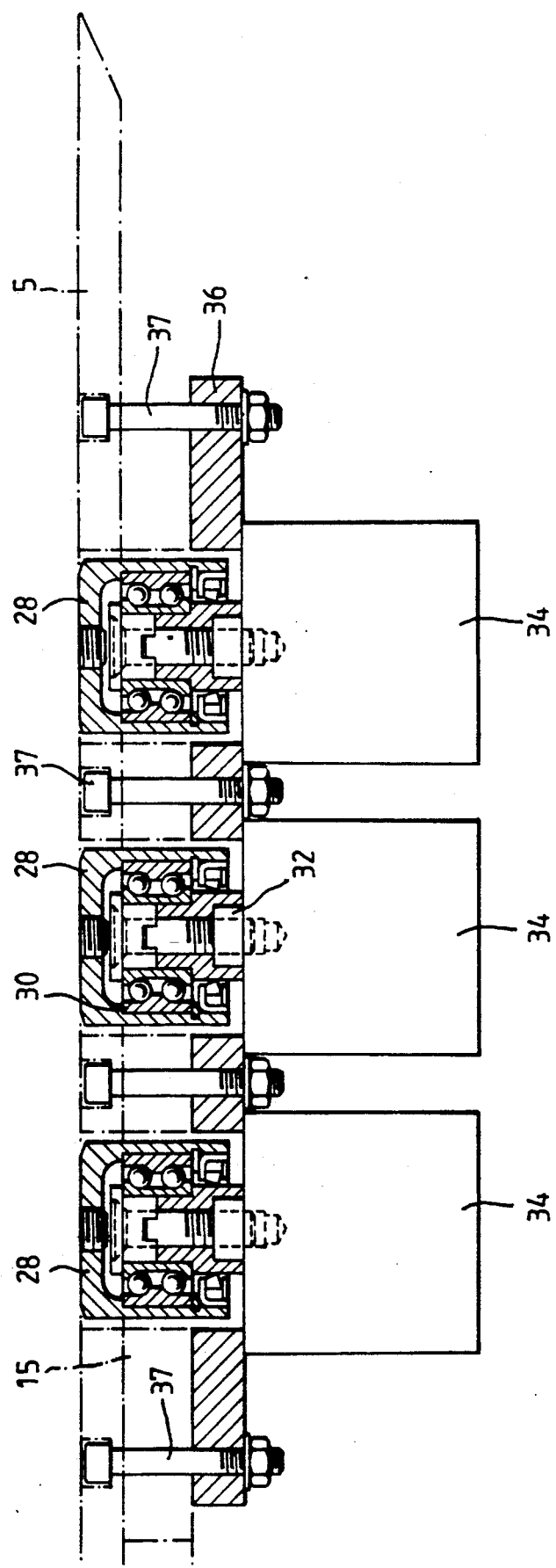
FIG. 6 is a longitudinal cross section showing the lifting members at the orientation station.

The skid plate 5 is disposed on the table 15 and the lifters 12 are mounted on the underside of the table. As shown most clearly in FIG. 6, the lifters each comprise an inverted cup shaped member 28 journalled by a roller bearing 30 on the output rod 32 of a double acting pneumatic cylinder 34 secured to a cylinder mounting plate 36 secured by bolts 37 to the underside of the table 15.

Figure 7:
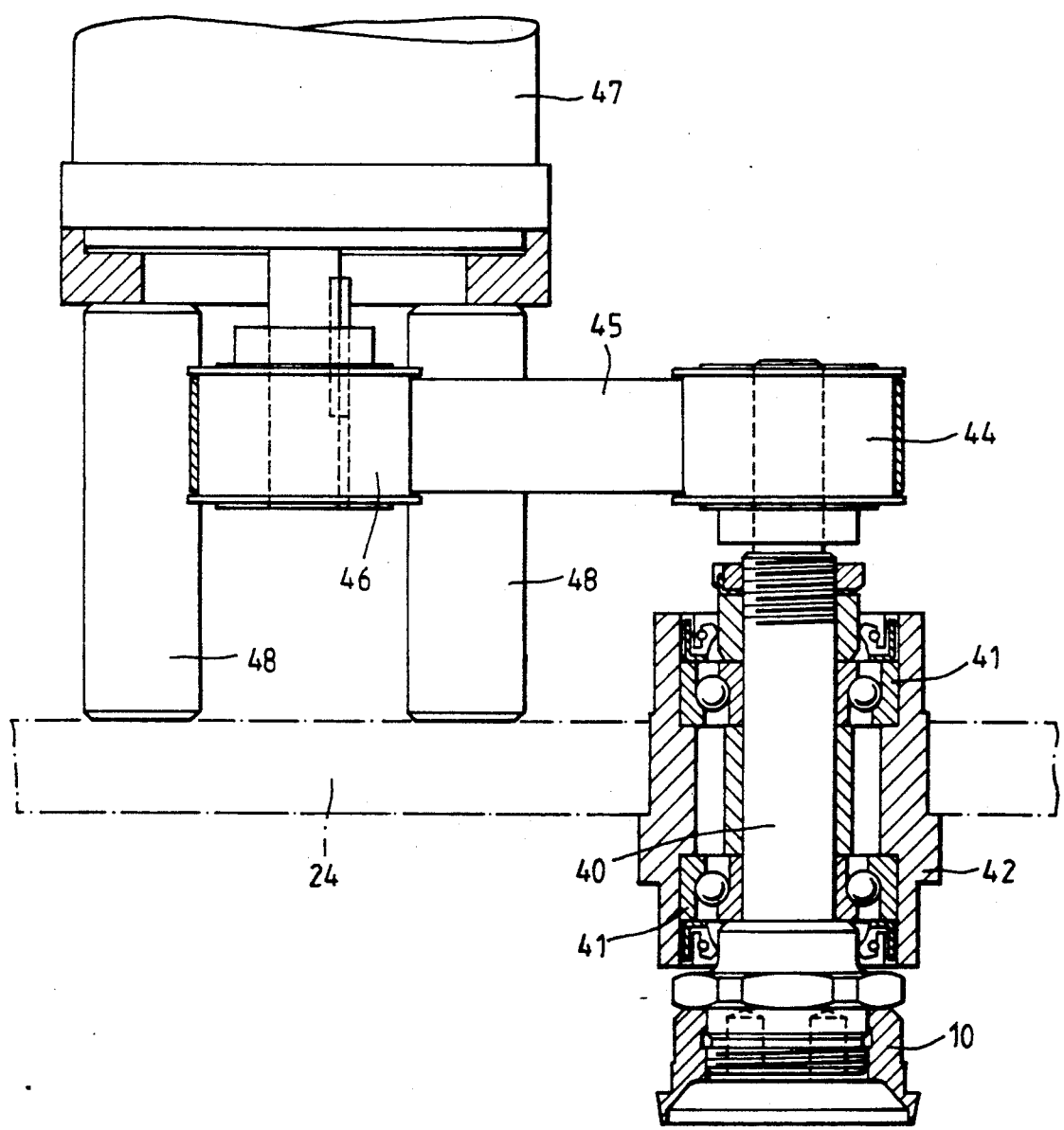
FIG. 7 is a sectional view showing the drive arrangement for one of the chucks.

The chucks 10 are each fast with the lower end of a spindle 40 which passes through the platform 24 and is journalled by roller bearings 41 in a bearing housing 42 fixed to the platform, as shown in FIG. 7. A pulley 44 is fitted to the upper end of the spindle and a belt 45 is trained around this pulley and a drive pulley 46 keyed on the output shaft of a servomotor 47 supported by pillars 48 on the platform 24. Referring to FIG. 5, it may be seen that the six servomotors associated with the respective chucks are positioned on the platform so that they drive the pulleys 44 through belts 45 of equal length. The servomotors 47 are equipped with encoders adapted to provide a signal output of 1000 counts per revolution of the motor shaft, which allows accurate control over the rotation of the chucks, and hence the containers engaged with the chucks, by a central processing unit (C.P.U.) to which the encoder signals are conducted.

Fibre optic sensors 50 (FIG. 8) are also connected to the C.P.U. and are disposed above the table 15 for scanning the respective containers as they rotate in order to detect a predetermine unique feature on the can periphery, which could be an element, i.e. a light or dark coloured part of the can decoration. When the feature of a given can is detected, the motor coupled to the associated chuck is controlled so that the rotation of the can is stopped with the can at the desired orientation position, which may involve the container being indexed or rotated through a certain angle after the feature has been recognised. The cans may be scanned and orientated concomitantly or in sequence by appropriate programming of the C.P.U.

When all the containers in a multipack have been rotationally orientated, the lifters 12 are retracted by their pneumatic cylinders 34 for disengaging the containers from the chucks 10. Because the chucks are shaped to make a good fit with the tops of the cans, a stripper bar 52 is provided to ensure that the cans disengage from the chucks. The stripper bar 52 extends longitudinally between the two rows of chucks 10 (FIG. 3) for acting against the rims of all six cans in the multipack. The stripper bar is carried by a double acting pneumatic cylinder 54 which is mounted on the underside of the platform 24 and which is actuable to displace the bar downwardly through a short stroke to knock the cans away from their chucks if they do not disengage automatically when the lifters 12 are lowered. It will be understood that the stripper bar will be actuated simultaneously with or a very short time after actuation of the cylinders 34 to lower the lifters 12.

Figure 8:
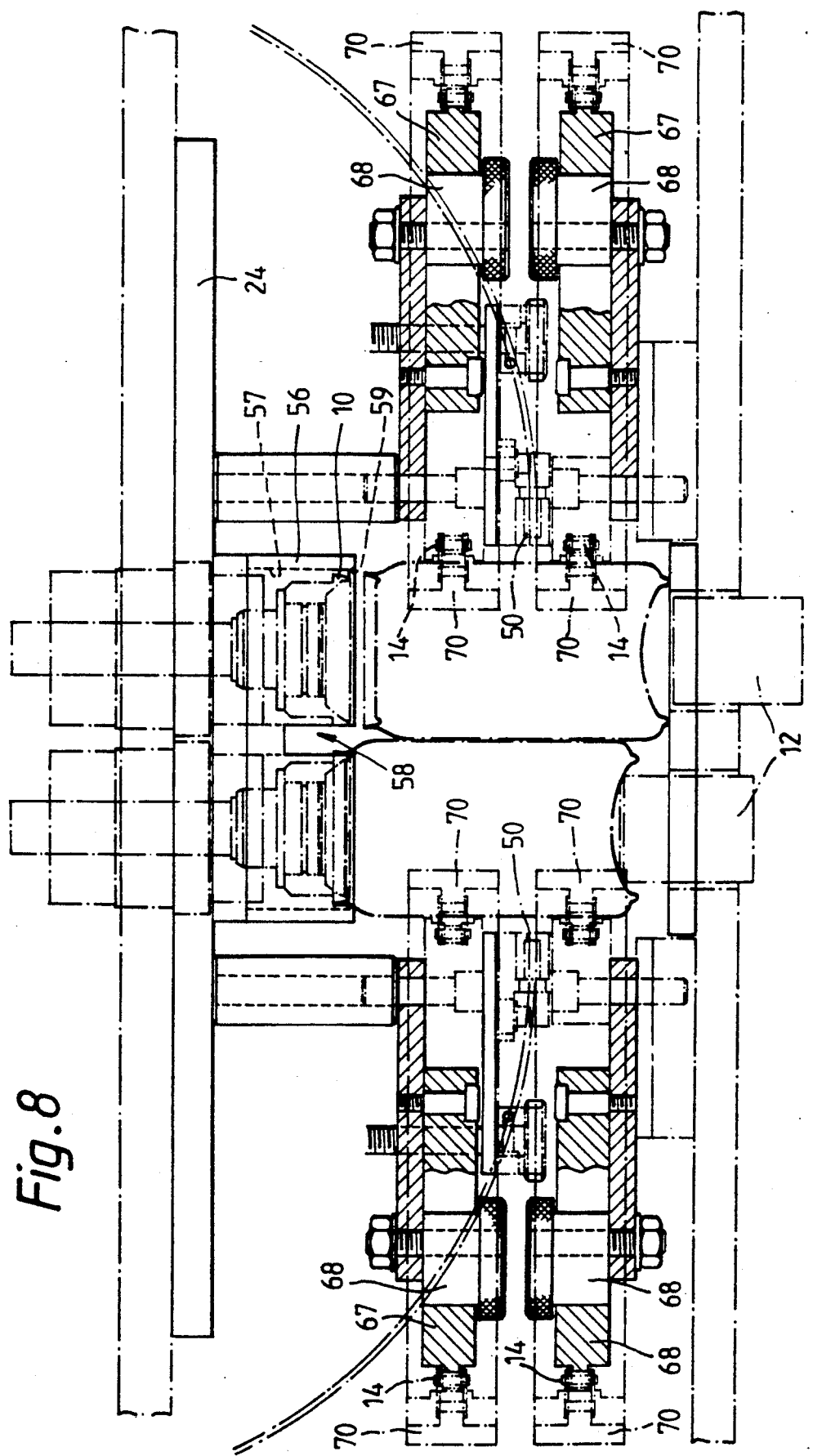
FIG. 8 is a transverse cross section at the orientation station showing one container lifted into engagement with its associated chuck and the other container in its lowered position sitting on the skid plate.
Figure 9:
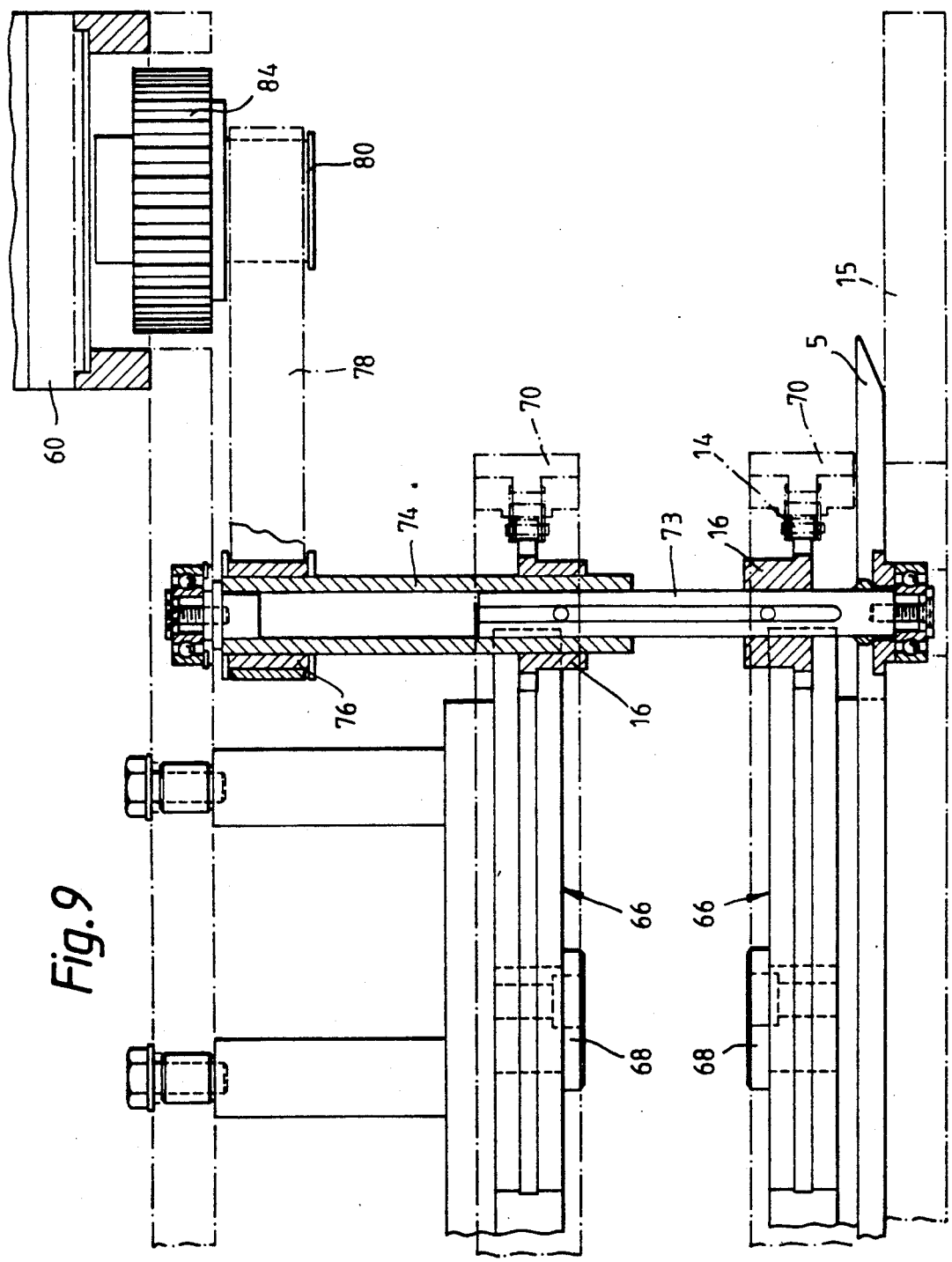
FIG. 9 is a longitudinal elevation, partly in cross section, illustrating the drive system of the feed mechanism.

As shown in FIG. 8, a chuck housing 56 is secured to the underside of the platform 24 and the chucks 10 are accommodated in respective pockets 57 in the housing. The housing 56 also has a longitudinal groove 58 to receive the stripper bar 52 which is not shown in FIG. 8. At the lower edges of the chuck pockets, the housing 56 has tapered guide surfaces 59 which serve to guide the containers into correct engagement with the chucks 10 should the containers tilt out of precise alignment upon being lifted rapidly by the lifters 12.

The feed mechanism for feeding multipacks into the orientation station is operated by an electric motor 60 mounted on the platform 24. Two paris of endless chain and dog drives are provided, one pair being supported from the underside of the platform 24 and the second lower pair being supported on the table 15. The chains of each pair are disposed symmetrically on opposite sides of the linear feed path indicated by arrows in FIG. 3. Each endless chain 14 is guided around a closed loop by the drive sprocket 16, a pinion or a turning post 64 and two chain tensioners 66. Between the sprocket 16 and post 64 there is a linear reach extending parallel to the feed direction. The chain tensioners comprise pivotally mounted arcuate arms 67 and rotatable eccentric cams 68 for pivoting the arms to adjust the chain tension. Hydraulic dampers (not shown) may be arranged to act on the arms 67 as well to take up automatically any excess slack in the chains between adjustments of the cams 68. Fixed on the chain 61 at specific intervals are dogs 70, which are substantially triangular in plan view. The spacing between the dogs is such that when one dog 70' (FIG. 3) is in position where it has just pushed a multipack into the orientation station, the immediately following dog 70" is positioned ready to pick up the next multipack arriving at the reception station, but remains clear of the feed path so that it does not obstruct movement of the multipack into the reception station. In this respect it is to be noted that the dogs 70 have leading faces which are inclined rearwardly, in the direction away from the chain, and as the dog 70" passes around the post 64 it is brought into gradual abutment with the trailing can of the multipack in a gentle manner so that sharp impacts of the dogs against the cans are avoided. The trailing faces of the dogs are also inclined, being arranged at an angle of about 90° to the leading faces. The trailing faces of the dogs 70' at the orientation station can provide stops for the following multipack arriving at the reception station.

The drive sprockets 16 for the upper and lower endless chains 14 on either side of the feed path are keyed to a telescopic shaft, the upper end of which is journalled in the platform 24 and the lower end of which is journalled in the table 15. The two telescopic shaft sections 73, 74 are keyed or splined to rotate together and the upper pinion is fast with the upper section 74 while the lower pinion is fast with the lower section 73. Thus, when the height of the platform is changed, the upper pair of dog and chain drives is moved up or down with the platform to suit the particular height of the containers to be orientated. At their upper ends the telescopic shafts 73, 74 are fitted with pulleys 76 around which are trained belts 78, 79 which pass around respective drive pulleys 80, 81. The drive pulley 80 is fixed directly onto the output shaft of the motor 60, to which a gear 84 is also fitted. The gear 84 meshes with a reversing gear 85 leaving the same number of teeth and fixed on a spindle 86 journalled in the platform 24 (FIG. 5). On the same spindle is fixed the pulley 81. Thus, when the motor 60 is energised the gears 84, 85 are driven at equal speeds but in opposite directions, and hence the endless chains on opposite sides of the feed path are driven around their closed paths at equal speeds and opposite directions. The motor 60 will be energised for sufficient time to move the dog at 70" to the position of the dog shown at 70' in FIG. 3, thereby moving the multipack at the reception station into the orientation station while simultaneously the dogs initially at 70' displace the multipack of orientated containers from the orientation station and out of the machine to conveyor 4. In order to control accurately the positions at which the dogs 70 are stopped after each feed operation, a sensor 90 may be located to detect a flag, e.g. a magnet or the like, mounted on one of the gears 84, 85. Thus, with the gearing so arranged that one or more complete revolutions of the gears 84, 85 correspond to the indexed displacement of the dogs 70 during each feed step, the exact positioning of the dogs can be ensured. In a modified construction flags, such as magnets are located on the dogs 70 themselves with a sensor being appropriately located, the control unit which is coupled to both the sensor and the encoder of the chain drive motor being arranged to stop the dogs at the correct positions.

Figure 10:
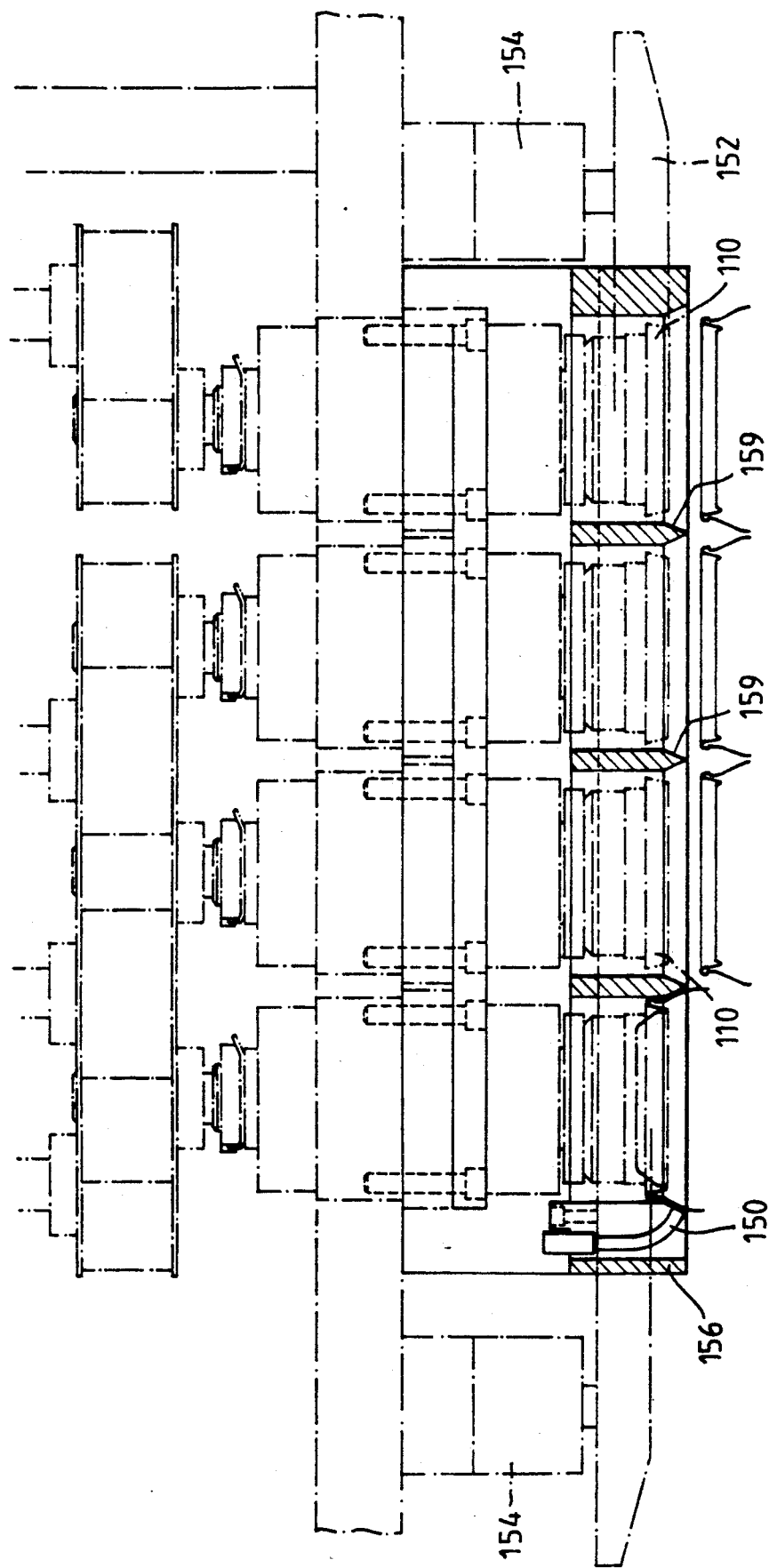
FIG. 10 is a partial longitudinal section showing the chuck assembly for a modified container orientation machine.

The described machine is able to orientate containers of multipacks at high speed and at a rate in terms of multipacks per minute which has not been possible with prior art orientation machines. Modifications are of course possible without departing from the spirit and scope of the invention. Where as the machine specifically described is intended for use with multipacks of six containers, the machine may be readily adapted for use with multipacks of other sizes and configurations. Thus, shown in FIG. 10 is part of a machine for use with twelve containers arranged in a rectangular array of 4×3 containers. There is a corresponding number of chucks 110 arranged in three rows of four. Two stripper bars 152 will be located between the adjacent rows and as shown pneumatic cylinders 154 are located at either end of each stripper bar, the cylinder at the left being shown raised and that at the right being shown lowered in FIG. 10. The chucks are located in a chuck housing 56 with tapered guide surfaces 159 at the entrances to the pockets, as described above. In addition, the chuck housing supports the fibre optic sensors 150 (only one shown) for scanning the container engaged with each of the chucks. The sensors are arranged for detection of a mark applied to the necks of the cans for orientation purposes. This arrangement has the advantage that the sensors do not have to be repositioned when the apparatus is adjusted and set up for orientating containers of different height.

Although the containers at the centre of a twelve container multipack do not usually require orientation because their side wall decoration is not visible to the exterior of the multipack, it is preferred to provide means to orientate all the containers as the same apparatus may then be used to orientate the containers of six container multipacks by delivering them two at a time, one behind the other, to the orientation station.

It should be understood that while the container orientation machine of the invention has been described specifically in connection with the orientation of containers held in multipacks by Hi-Cone couplers, the machine can also be used with multipacks having other forms of coupler, such as a plastic or cardboard tray.

We claim:

1. In an apparatus for rotationally orientating containers of multipacks in which the containers are held grouped together in a predetermined array by a packaging coupler, the apparatus comprising feeding means for feeding multipacks along a linear feed path from a reception station to an orientation station, a plurality of chuck means arranged at the orientation station for engagement by respective containers, a plurality of lifting members arranged at the orientation station in vertical alignment with respective chuck means, raising means actuable to raise the lifting members to lift the containers into engagement with the respective chuck means, a respective drive means coupled to each chuck means for rotating the chuck means and a container engaged therewith, sensor means for scanning the rotating containers and detecting a predetermined feature on each container, and control means coupled to the sensor means and the chuck drive means for rotation of the containers to be ceased with each of the containers having a desired rotational position, operation of the feeding means to feed a following multipack to the orientation station causing a multipack of orientated containers at the orientation station to be delivered away from the orientation station the improvement wherein the feeding means comprises a pair of endless members located on the opposite sides of said feed path, means guiding each said endless member for movement around a closed path including a linear section parallel to said feed path, abutment elements mounted on each of the endless members and spaced apart at predetermined intervals therealong for engaging the rearmost containers of a multipack at the reception and pushing the multipack forwards to the orientation station, a feed drive motor, and means coupling the endless members to said motor for said members to be driven synchronously at equal speed around said closed paths, and means to actuate the motor and thereby cause the endless members to be driven to displace the abutment elements through a predetermined distance around the closed paths when a multipack is to be fed from the reception station to the orientation station.

2. An apparatus according to claim 1 wherein the endless members are endless chains.

3. An apparatus according to claim 1, wherein the abutment elements have leading abutment surfaces which extend away from the endless members in a rearwardly inclined direction with respect to their direction of movement.

4. An apparatus according to claim 3 wherein the abutment elements have trailing surfaces extending at approximately 90° to said leading surfaces.

5. An apparatus according to claim 1, wherein two pairs of opposed endless members are provided, the two endless members on each side of the feed path being located one above the other.

6. An apparatus according to claim 1, wherein the guiding means for each endless member includes a guide member located at the upstream end of said linear section and shaped to guide the member around an arc for bringing the abutment elements into gradual abutment with the rearmost containers of a multipack at the reception station as said elements pass around said arc.

7. An apparatus according to claim 1, wherein the raising means comprises a respective individually operable actuator for each lifting member.

8. An apparatus according to claim 7, wherein the actuators are fluid operated actuators.

9. An apparatus according to claim 8, wherein the actuators are double acting pneumatic cylinders.

10. An apparatus according to claim 1, wherein a container guide means extends around each chuck means for guiding the containers into engagement with the chuck means.

11. An apparatus according to claim 10, wherein each chuck means is located in a chuck housing, and the guide means comprises an upwardly tapering surface on said housing.

12. An apparatus according to claim 1, wherein each chuck means is located in a stationary chuck housing, and the sensor means for scanning a container engaged with said chuck means is mounted on said chuck housing.

13. An apparatus according to claim 1, including stripper means for disengaging the containers from the chuck means.

14. An apparatus according to claim 13, wherein the stripper means comprises a stripper member positioned alongside the chuck means, and actuating means for lowering the stripper member to push downwardly on the upper rim of a container engaged with the chuck means.

15. An apparatus according to claim 14, wherein the stripper member is an elongate bar extending longitudinally for engaging a row of containers, and the lowering means comprises fluid cylinder means.

16. An apparatus according to claim 1, including a support frame comprising a fixed table surface, a supporting platform mounted above said table surface, and means for adjusting the height of the platform above the table surface, the chuck means and their drive means being mounted on the platform whereby the apparatus is adjustable for use with containers of different heights.

* * * * *